(No Model.)

H. BAINES.
DEVICE FOR FEEDING AND WATERING CATTLE IN CARS.

No. 268,603.          Patented Dec. 5, 1882.

Witnesses
H. R. Howard.
Wm. C. Howells

Inventor
Hugh Baines

UNITED STATES PATENT OFFICE.

HUGH BAINES, OF TORONTO, ONTARIO, CANADA.

DEVICE FOR FEEDING AND WATERING CATTLE IN CARS.

SPECIFICATION forming part of Letters Patent No. 268,603, dated December 5, 1882.

Application filed November 7, 1882. (No model.)

*To all whom it may concern:*

Be it known that I, HUGH BAINES, of the city of Toronto, in the county of York, Province of Ontario, in the Dominion of Canada, have invented certain new and useful Improvements in Means for Feeding and Watering Cattle, of which the following is a full, clear, and exact description.

This invention relates to improvements in that class of apparatus for feeding and watering cattle wherein a feed and water trough is arranged parallel to a car-track and suitably elevated to present feed and water to the animals in a car or cars.

The object of my invention is to provide means whereby hay and other coarse food, as well as water, are contained in a receiver and water trough or reservoir arranged parallel to a car-track, so that when a car containing cattle is stopped at the side of the receiver and trough or reservoir the cattle, by projecting their heads through side openings in the car, can obtain a supply of food and drink. The arrangement of the receiver is such that the hay or other coarse food is protected from the weather, and is presented to the cattle through a rack in that side of the receiver which faces the car, while the water trough or reservoir is supported outside of and at the front of the receiver, directly below the rack or at the bottom thereof.

The object of my invention I accomplish by the means illustrated in the accompanying drawings, in which—

Figure 1:
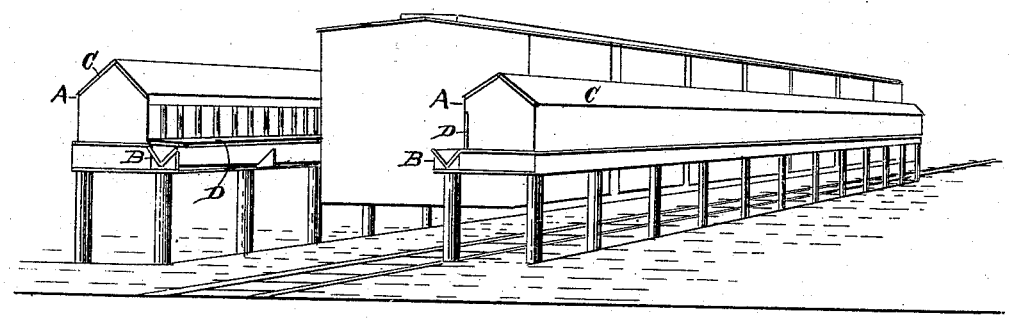
Figure 2:
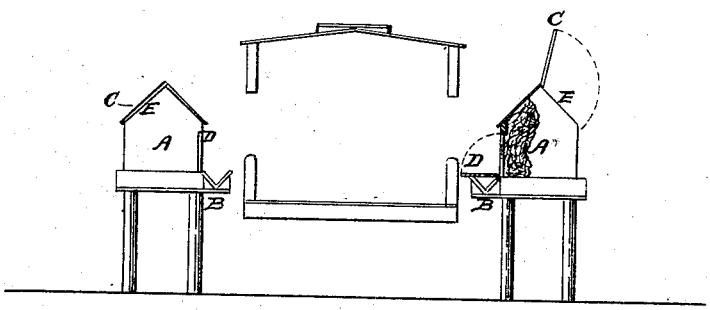

Figure 1 is a perspective view of two of the receivers and attached water troughs or reservoirs arranged on opposite sides of a railway-track, and Fig. 2 is a broken end elevation of the same.

Referring to the drawings, the letter A indicates a longitudinal receiver of box form, the top of which is inclined in opposite directions to shed water, one longitudinal half of the top being hinged to form a cover or lid, C, so that it can be lifted, and thus permit the requisite quantity of hay or other coarse food to be introduced into the receiver through the opening E. The box or receiver at the side which faces the car is in the form of an open rack consisting of vertical bars suitably spaced, so that an animal projecting its head from the car on the track can obtain the food from the receiver. To the lower front edge of the receiver is hinged a door, D, which is adapted to expose or conceal the rack in such manner that when this door D and the cover or lid C are closed the hay and other coarse food in the receiver will be effectually protected from the weather. The receiver is supported in a stationary position on standards or other supports fixed in the ground or otherwise suitably held in upright positions. The lower front part of the receiver is provided with projecting bars or supports, which sustain a water-receiving trough or reservoir, B, which extends longitudinally along the receiver, and is unobstructed by partitions, which are objectionable, in that they render the trough or reservoir difficult to cleanse and supply with water. The arrangement of the trough or reservoir is such that it is supported by the receiver immediately below or at the lower portion of the open rack in such manner that an animal can reach it through a side opening in a car and obtain a supply of water.

The trough or reservoir B is supplied with water through the medium of suitable pipes or hose, and as many ways of so doing will suggest themselves, I do not deem it essential to illustrate any particular manner of accomplishing that end. Any surplus water remaining in the trough or reservoir can be removed by opening suitable gravity-valves or plugs, or in any other suitable manner.

It will of course be understood that one of the receivers and attached trough or reservoir is arranged at each side of the car-track, parallel thereto, and at such distance therefrom as to be entirely free of the passing train, while it is sufficiently close to permit the cattle to extend their heads through side openings in the car and obtain the hay or other coarse food through the racks at the front of the receivers, or to obtain water from the troughs or reservoirs. The door of the receiver, which serves to open and close the rack, is so hinged that when opened it can rest upon the trough or reservoir and be supported thereby, which is advantageous in relieving the hinges of the door from undue strain.

It will of course be understood that the length of the receiver or box is such as to equal any ordinary train of stock-cars that may travel on the line.

Having thus described my invention, what I claim is—

As an improvement in feeding and watering cattle from stock-cars, an elevated box or receiver for containing hay or other coarse food, arranged in a stationary position at the side of a car-track, and having its front side, which faces the cars, provided with an open rack, in combination with a water trough or reservoir supported at the front of the box or receiver, substantially as and for the purpose described.

HUGH BAINES.

Witnesses:
MATT. TAYLOR,
JAS. HOWARD.